(12) United States Patent
Taniguchi (10) Patent No.: US 12,113,253 B2
(45) Date of Patent: Oct. 8, 2024

(54) FUEL CELL SYSTEM

(71) Applicants: KYOCERA CORPORATION, Kyoto (JP); DAINICHI CO., LTD., Niigata (JP)

(72) Inventor: Eiji Taniguchi, Moriyama (JP)

(73) Assignees: KYOCERA Corporation, Kyoto (JP); DAINICHI CO., LTD., Niigata (JP)

(*) Notice: Subject to any disclaimer, the term of this patent is extended or adjusted under 35 U.S.C. 154(b) by 337 days.

(21) Appl. No.: 17/614,341

(22) PCT Filed: May 25, 2020

(86) PCT No.: PCT/JP2020/020609
§ 371 (c)(1),
(2) Date: Nov. 25, 2021

(87) PCT Pub. No.: WO2020/241593
PCT Pub. Date: Dec. 3, 2020

(65) Prior Publication Data
US 2022/0223891 A1    Jul. 14, 2022

(30) Foreign Application Priority Data
May 27, 2019 (JP) .................................. 2019-098644
May 27, 2019 (JP) .................................. 2019-098645

(51) Int. Cl.
*G05B 15/02* (2006.01)
*H01M 8/04089* (2016.01)
(Continued)

(52) U.S. Cl.
CPC ........ *H01M 8/04753* (2013.01); *G05B 15/02* (2013.01); *H01M 8/04089* (2013.01); *H01M 8/04582* (2013.01)

(58) Field of Classification Search
None
See application file for complete search history.

(56) References Cited

U.S. PATENT DOCUMENTS 6,645,653 B2 * 11/2003 Kashiwagi .......... H01M 8/0612
429/430
7,582,371 B2 * 9/2009 Akiyama ............ H01M 8/0441
429/432
(Continued)

FOREIGN PATENT DOCUMENTS

EP        2461407 A1   6/2012
JP     2013164928 A    8/2013
(Continued)

*Primary Examiner* — Jason Lin
(74) *Attorney, Agent, or Firm* — VIERING, JENTSCHURA & PARTNER MBB (57) ABSTRACT

A fuel cell system includes an oxygen-containing gas supply that supplies air to a fuel cell module, a fuel supply that supplies a fuel gas to a fuel cell, a power regulator that regulates supply of a generated current to a load, and a controller. The controller includes a plurality of relational expressions predefined and representing a relationship between a generation current level of the fuel cell and at least one of an air utilization or a fuel utilization, and selects at least one of the plurality of relational expressions based on an increase rate of the current set by the power regulator to increase the generation current level for an independent operation to be performed in, for example, an outage.

7 Claims, 4 Drawing Sheets

(51) Int. Cl.
*H01M 8/04537* (2016.01)
*H01M 8/04746* (2016.01)

(56) References Cited

U.S. PATENT DOCUMENTS

| | | | |
|---|---|---|---|
| 10,164,276 B2* | 12/2018 | Takashi | H01M 8/04805 |
| 10,826,088 B2* | 11/2020 | Scotto | H01M 8/2483 |
| 2002/0148284 A1* | 10/2002 | Baldauf | G01N 25/005 |
| | | | 374/45 |
| 2003/0110841 A1* | 6/2003 | Zhang | H01M 8/04194 |
| | | | 73/61.76 |
| 2004/0013920 A1* | 1/2004 | Hasuka | H01M 8/04223 |
| | | | 429/444 |
| 2005/0119842 A1* | 6/2005 | Clingerman | H01M 8/04567 |
| | | | 702/63 |
| 2007/0042235 A1* | 2/2007 | Kagami | H01M 8/0491 |
| | | | 429/432 |
| 2010/0167154 A1* | 7/2010 | Ono | H01M 8/04089 |
| | | | 429/457 |
| 2011/0064976 A1* | 3/2011 | Shimoda | H01M 10/44 |
| | | | 429/431 |
| 2012/0148933 A1 | 6/2012 | Takashi et al. | |
| 2012/0183876 A1 | 7/2012 | Takashi et al. | |
| 2019/0245220 A1* | 8/2019 | Scotto | H01M 8/04708 |

FOREIGN PATENT DOCUMENTS

| | | | |
|---|---|---|---|
| JP | 2013229228 A | 11/2013 | |
| JP | 5528451 B2 | 6/2014 | |
| JP | 5591249 B2 | 9/2014 | |

* cited by examiner

FUEL CELL SYSTEM

CROSS-REFERENCE TO RELATED APPLICATIONS

This application is a national stage entry according to 35 U.S.C. § 371 of PCT Application No. PCT/JP2020/020609 filed on May 25, 2020, which claims priority to Japanese Application No. 2019-098644 filed on May 27, 2019, and Japanese Application No. 2019-098645 filed on May 27, 2019, which are entirely incorporated herein by reference.

FIELD

The present disclosure relates to a fuel cell system.

BACKGROUND

Solid oxide fuel cell (SOFC) systems generate power using a raw fuel (hydrogen-containing gas) and air (oxygen-containing gas). Fuel cell systems may be used in small-scale power generation for applications that use a low level of power (current value), such as homes and small businesses. For such use, the level of power requested by an external load (hereafter simply a load) varies relatively largely. Fuel cell systems thus have, in addition to a rated operation mode, an operation (or mode) defined by specifications called a load-following operation mode or a partial load operation mode in which a lower level of current is generated than in a rated operation.

Patent Literature 1 shows the relationship between an air utilization Ua (%) of a cell stack and a generation current level, or a current value I (A), during a partial load (or load-following) operation. In a graph showing the correlation between the air utilization Ua and the generation current level I, the technique described in Patent Literature 1 increases, in response to an increase in the generation current level I requested by a load, the air utilization Ua at a rate that changes in accordance with the temperature of air (oxygen-containing gas) inside the housing.

For such a partial load operation, Patent Literature 2 shows the relationship between a fuel utilization Uf (%) of a cell stack and a generation current level, or a current value I (A), during a partial load (or load-following) operation. In a graph showing the correlation between the fuel utilization Uf and the generation current level I, the technique described in Patent Literature 1 increases, in response to an increase in the generation current level I requested by a load, the fuel utilization Uf at a rate represented by a nonlinear function, such as a quadratic curve or a third-order curve.

A fuel cell system also has an independent operation mode for independently supplying power to a load when the system is disconnected from an electrical grid in, for example, a power outage or a loss of an external power supply.

In the independent operation mode, the current level may be increased at a higher rate to promptly respond to changes in (or requests from) an external load and to improve responsiveness to an output level to an external load (load responsiveness). In this case, the cell stack may temporarily lack a sufficient amount of air or fuel gas or both to generate power, possibly damaging unit cells in the stack.

CITATION LIST

Patent Literature

Patent Literature 1: Japanese Patent No. 5528451
Patent Literature 2: Japanese Patent No. 5591249

BRIEF SUMMARY

A fuel cell system according to one or more aspects of the present disclosure includes a fuel cell that generates power using a fuel gas and an oxygen-containing gas, an oxygen-containing gas supply that supplies the oxygen-containing gas to the fuel cell, a fuel supply that supplies the fuel gas to the fuel cell, a power regulator that regulates supply of a current generated in the fuel cell to a load, and a controller that controls at least one of the oxygen-containing gas supply or the fuel supply, and the power regulator. The controller includes a plurality of relational expressions predefined and representing a relationship between a generation power level of the fuel cell and at least one of an air utilization or a fuel utilization, and selects at least one of the plurality of relational expressions based on a current increase rate set by the power regulator.

BRIEF DESCRIPTION OF DRAWINGS

The objects, features, and advantages of the present disclosure will become more apparent from the following detailed description and the drawings.

DETAILED DESCRIPTION

A fuel cell system according to one or more embodiments will now be described with reference to the drawings.

Figure 1:
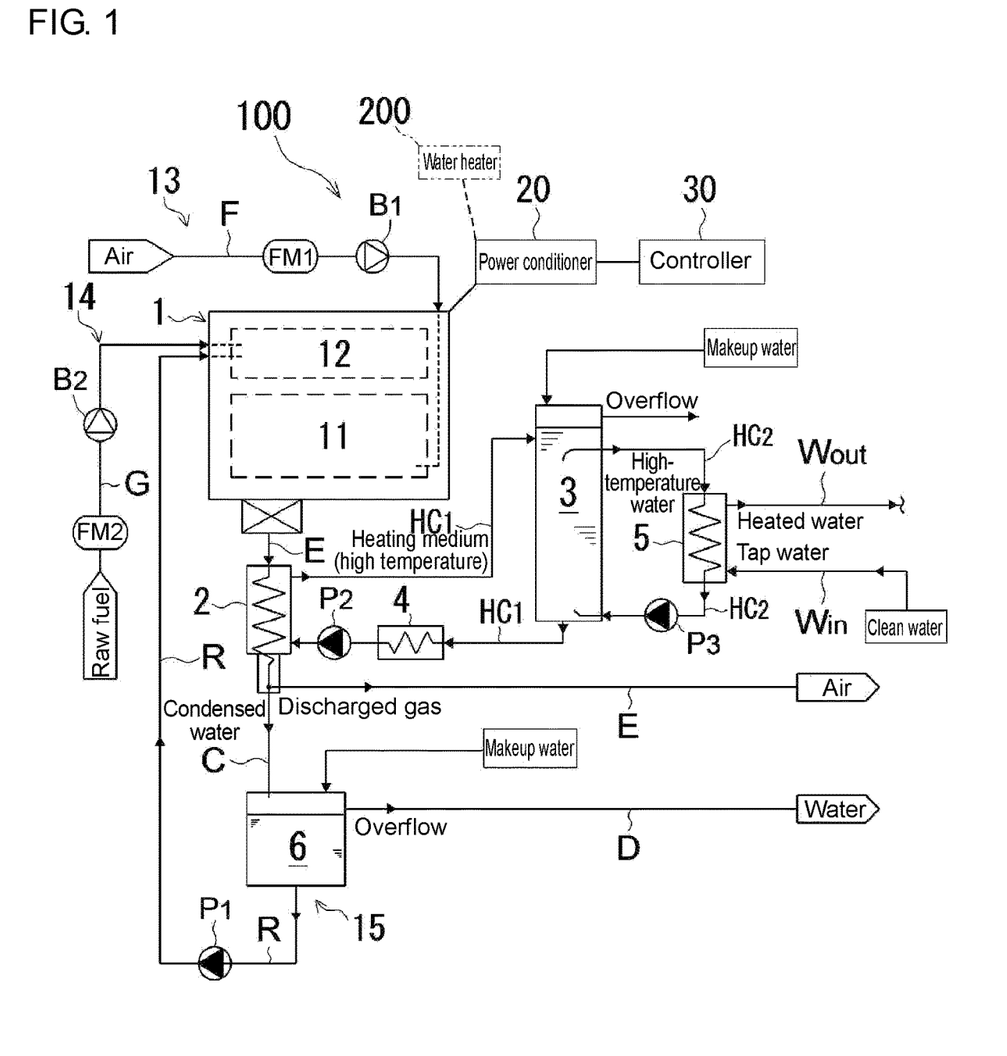
FIG. 1 is a schematic diagram of a fuel cell system according to an embodiment.

A fuel cell system 100 according to one or more embodiments shown in FIG. 1 includes a fuel cell module 1 that generates power using a fuel gas and an oxygen-containing gas and auxiliary devices for assisting independent power generation of the fuel cell. The auxiliary devices include an oxygen-containing gas supply 13 including an air blower B1 and an air channel F, a fuel supply 14 including a fuel pump B2 and a raw fuel channel G, and a reformed water supply 15 including a reformed water tank 6 and a reformed water pump P1.

The fuel cell system 100 further includes a power regulator (power conditioner 20) as an auxiliary device that supplies power to an external unit and coordinates with the electrical grid, and a controller 30 that controls the operation of the auxiliary devices assisting the power generation operation of the fuel cell as described above in cooperation with the power conditioner 20. The power conditioner 20 includes an ammeter (in amperes) and a voltmeter (in volts).

The fuel cell system 100 according to one or more embodiments further includes a waste heat recovery system (heat cycle HC1). The waste heat recovery system includes a heat exchanger 2, a heat storage tank 3 (also referred to as a hot water tank), a heat dissipater (radiator 4), channel pipes connecting these components, and a heating medium pump P2.

The fuel cell system 100 shown in FIG. 1 further includes a second heat exchanger 5 (also referred to as a clean water heat exchanger) for heating tap water (clean water) to be supplied to an external unit, and a hot water supply system (heat cycle HC2). The hot water supply system includes a heat pump P3 and a circulation pipe for receiving and circulating a high-temperature heating medium from the heat storage tank 3. The fuel cell system may be used as a monogeneration system that does not supply hot water to an external unit.

Figure 2:
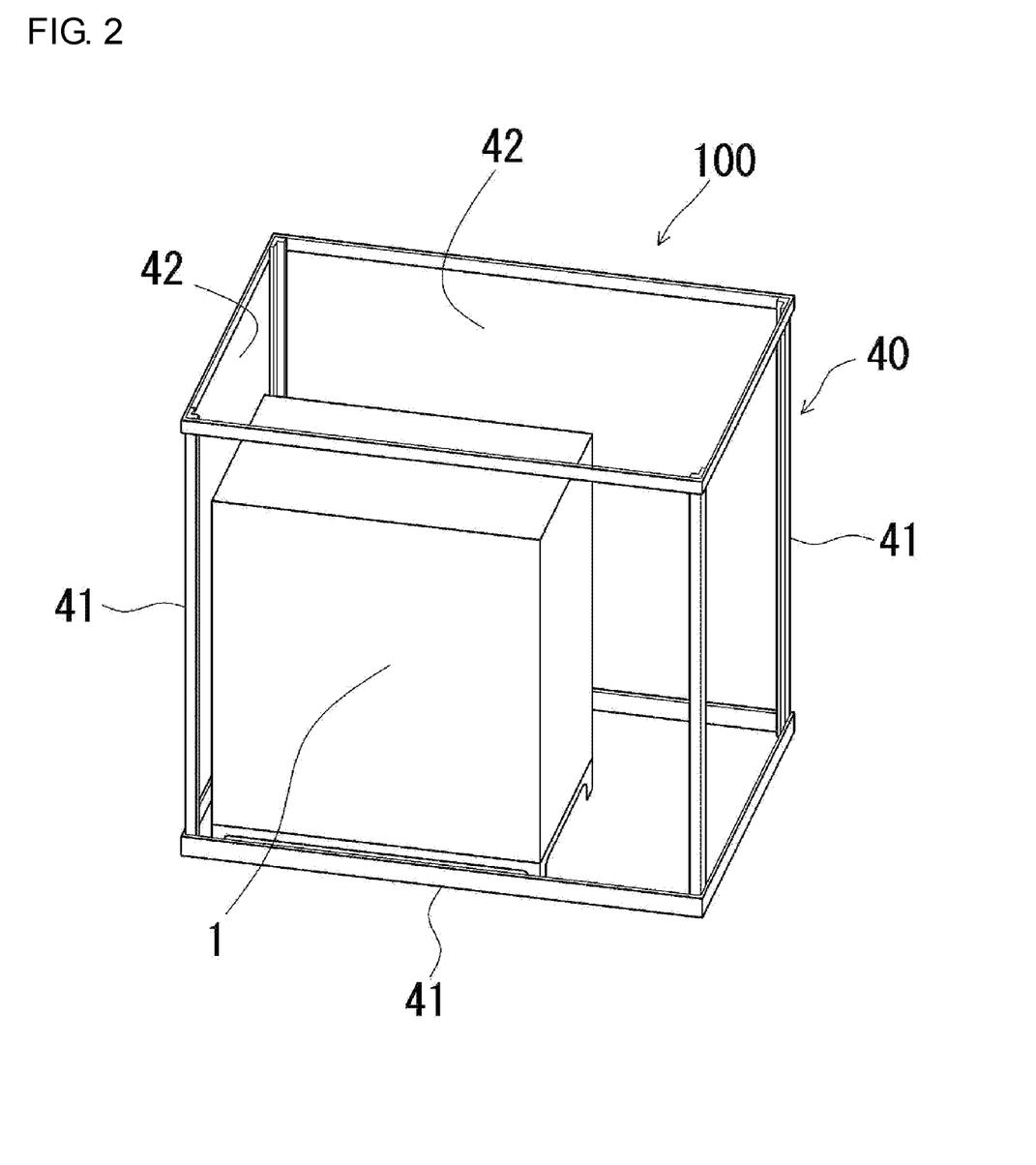
FIG. 2 is a perspective view of the fuel cell system housed in an external case.

The fuel cell system 100 is housed in a case 40 as shown in FIG. 2. The case 40 includes frames 41 and exterior panels 42. The case 40 further contains multiple measurement devices, sensors, and other devices on and around the fuel cell module 1 and the auxiliary devices, channels, and piping.

For example, an air flowmeter FM1, such as a flowmeter, is installed on the air channel F in the oxygen-containing gas supply 13, which supplies air (oxygen-containing gas) to the fuel cell module 1. The air flowmeter FM1 measures the flow rate per unit time of air supplied to a cell stack 11.

For example, a fuel flowmeter FM2, such as a flowmeter, is installed on the raw fuel channel G in the fuel supply 14, which supplies raw fuel (gas) to the fuel cell module 1. The fuel flowmeter FM2 measures the flow rate per unit time of raw fuel (fuel gas) such as utility gas supplied to a reformer 12.

The fuel cell system 100 may also include multiple temperature meters or thermometers (not shown), such as temperature sensors and thermistors for measuring the temperature of the components of the fuel cell.

The controller 30 that centrally controls the operation of the fuel cell system 100 is connected to a memory and a display (both not shown) and to various components and various sensors included in the fuel cell system 100. The controller 30 controls and manages these functional components and thus controls and manages the entire fuel cell system 100. The controller 30 also obtains a program stored in its memory, and executes the program to implement various functions of the components of the fuel cell system 100.

To transmit control signals or various types of information from the controller 30 to other functional components or devices, the controller 30 may be connected to the other functional components either with wires or wirelessly. The particular control performed by the controller 30 in the present embodiment will be described later.

In the present embodiment, the controller 30 specifically controls the operation of the air blower B1 in the oxygen-containing gas supply 13 that supplies air to the cell stack 11 and the operation of the fuel pump B2 or other components in the fuel supply 14 based on the level of power requested from an external load, instructions and commands from an external unit (e.g., a water heater 200) connected to the fuel cell system, measurement values of, for example, an ammeter indicating the level of power supply to an external unit and a voltmeter (e.g., apparent power in volt-amperes), or measurement values of various sensors listed above.

More specifically, the controller 30 in the fuel cell system 100 with the structure described above controls the operations of the oxygen-containing gas supply 13 and the fuel supply 14 and supplies, to each unit cell, an oxygen-containing gas and a fuel gas in amounts intended for operation. The power generated by the unit cells is supplied to an external load through the power regulator (power conditioner 20).

The air flow rate control for controlling, or specifically increasing or decreasing, the air utilization (Ua) representing the flow rate of air in response to the generation current level I (A) will now be described.

The controller 30 included in the fuel cell system 100 according to first and second embodiments controls the air blower B1 in response to the generation current level I (A) controllable by the power regulator (hereafter, the power conditioner 20). The controller 30 controls the air blower B1 in accordance with the air utilization (Ua) preset in correspondence with the generation current level I (A). The air utilization Ua refers to the ratio of the amount of air used for power generation to the amount of air supplied to the fuel cell.

The controller 30 included in the fuel cell system 100 according to the embodiments includes multiple relational expressions each representing the relationship between the generation power level of the fuel cell (fuel cell module 1) and the air utilization, and selects one of the relational expressions based on the current increase rate set by the power conditioner 20. The controller 30 selects a relational expression appropriate for the current increase rate to reduce damage to the unit cells.

The current increase rate refers to a displacement (difference) per unit time that occurs when the level of current generated by the fuel cell (generation current level or current value) changes, or specifically increases. The current increase rate is in amperes (A) per second.

Figure 3:
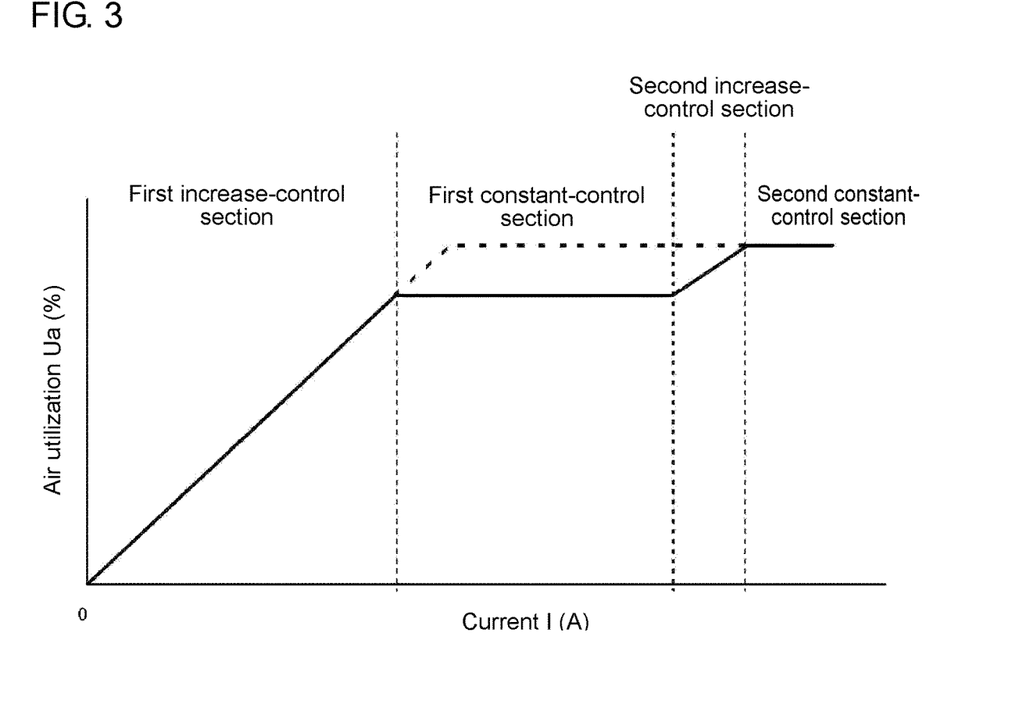
FIG. 3 is a graph showing the relationship between a generation current level (I) and an air utilization (Ua) in a cell stack included in the fuel cell system according to a first embodiment.

FIG. 3 is a graph showing the relationship between the generation current level (I) and the air utilization (Ua) in the cell stack included in the fuel cell system according to the embodiments. FIG. 3 shows two curves of relational expressions, one indicated by a solid line and the other indicated partially by a broken line. The air utilization Ua and the generation current level I as the generation power level may be set as appropriate for, for example, the scale of the fuel cell system (rated generation power level). FIG. 3 thus merely shows example relational expressions (graph) representing the relationship between the air utilization Ua and the generation power level (I). Three or more relational expressions may be defined. The relational expressions will be described with reference to the graph of FIG. 3.

FIG. 3 shows examples of a first relational expression (partially indicated by a broken line) selected in a normal operation in one or more embodiments of the present disclosure and a second relational expression (indicated by a solid line) selected during an independent operation in, for example, an outage in one or more embodiments of the present disclosure. These relational expressions are identical except the part of the first relational expression indicated by the broken line. A segment indicated by a broken line in the curve of the first relational expression is an example segment of the graph curve showing the relationship between the air utilization Ua and the generation current level I during operation except during an independent operation in, for example, an outage. In other words, this is an example segment of the graph curve during the normal operation (when the current increase rate is slow or low in one or more embodiments of the present disclosure).

The identical parts of these relational expressions will be described first. In the graph of FIG. 3 showing the relationship between the generation current level I and the air utilization Ua of the fuel cell, each of the relational expressions includes a first increase-control section in which the air utilization Ua of the fuel cell gradually increases in response to an increase in the current level I.

In the first increase-control section, the air utilization Ua is set low at the start and then increases gradually in response to an increase in the current level I of the fuel cell. In this manner, more extra oxygen-containing gas (air) is used at the start to increase the heat of combustion, thus rapidly increasing the temperature of the fuel cell and shortening the starting time. As the current level I increases, the air utilization Ua increases gradually. This raises the temperature of the fuel cell, while enabling an efficient operation.

In the graph of FIG. 3, each of the relational expressions includes a second constant-control section in which the air utilization Ua is constant. The second constant-control section is referred to as a rated section in which the output from the fuel cell is a maximum rated current. In the section in which the current level I is high, the air utilization Ua is set high for an efficient operation.

The first and second relational expressions differ from each other in the sections described below. More specifically, a first constant-control section and a second increase-control section in the graph of FIG. 3 above are different from the corresponding sections used in the normal operation. The first constant-control section and the second increase-control section are continuous with each other, and are examples of at least a partial current-control section in an aspect of the present disclosure. These relational expressions will be described using the second relational expression as a reference.

In FIG. 3, the first constant-control section is to flatten the increase in the air utilization Ua that has gradually increased as the current level I increases in the first increase-control section. In the first constant-control section, the air flow rate is increased at the same rate as the rate of increase in the current level I. The resultant segment of the graph has no gradient in this section, in which the relationship between the current level I and the air utilization Ua is represented by a primary expression with the coefficient 0. The coefficient in the primary expression may not be precisely 0 but may be substantially 0.

More specifically, in the independent operation mode in which the current increase rate set by the power regulator 20 is greater than or equal to a predetermined rate, the controller 30 selects, at least in the first constant-control section described above, the second relational expression defining the air utilization Ua in the first constant-control section lower than in the first increase-control section included in the first relational expression to be selected for the current increase rate lower than the predetermined rate.

The relational expression may be selected entirely as described above, or may be selected, for example, partially for this different section. In the first constant-control section, the air utilization Ua increases at a rate different from the rate of increase in the first increase-control section described above as the current increases.

The first constant-control section is followed by the second increase-control section that connects the first constant-control section and the second constant-control section. In the second increase-control section, the relationship between the current level I and the air utilization Ua is represented by a primary expression with the coefficient of a positive (plus) value. The graph segment in this section may have a gradient set as appropriate and may have a larger or smaller gradient than in the first increase-control section.

In this manner, the first increase-control section and the second constant-control section are separated by the first constant-control section and the second increase-control section in which the air utilization Ua is lower or more air is supplied to the cell stack than in the normal operation. This reduces the likelihood of the air utilization becoming high (high Ua) in these sections during the independent operation.

The fuel cell system 100 according to the present embodiment entering the independent operation mode at the high current increase rate has the preset amount of air supply larger than in the normal operation, and thus is less likely to have the amount of air temporarily lacking for power generation in the cell stack and have the air utilization becoming high (high Ua) in response to a rapid increase in a load current (output current) requested from an external load.

The fuel cell system can perform the independent operation in, for example, an outage, without the unit cells being damaged or having other failures. The fuel cell system can thus be durable.

The coefficient in the primary expression representing the relationship between the current level I and the air utilization Ua in the first constant-control section in FIG. 3 may be a negative value, or in other words, the graph curve may have a negative gradient.

The increase in the air utilization Ua in response to the current level I in the second increase-control section may not be represented by a linear line (or function), but may be represented by a nonlinear function, such as a quadratic curve (quadratic function) or a third-order curve (third-order function). This is the same in the first increase-control section.

A second embodiment will now be described with reference to FIG. 4. The setting of the air utilization Ua in the first embodiment shown in FIG. 3 differs from the setting of the air utilization Ua in the second embodiment shown in FIG. 4 in that the air utilization Ua decreases in the second increase-control section in the first relational expression in FIG. 3, and the air utilization Ua is either constant (FIG. 3) or decreases (FIG. 4) as the current value increases in the rated section in which the output from the fuel cell is the maximum rated current. The same parts as in the first embodiment will be described briefly.

Figure 4:
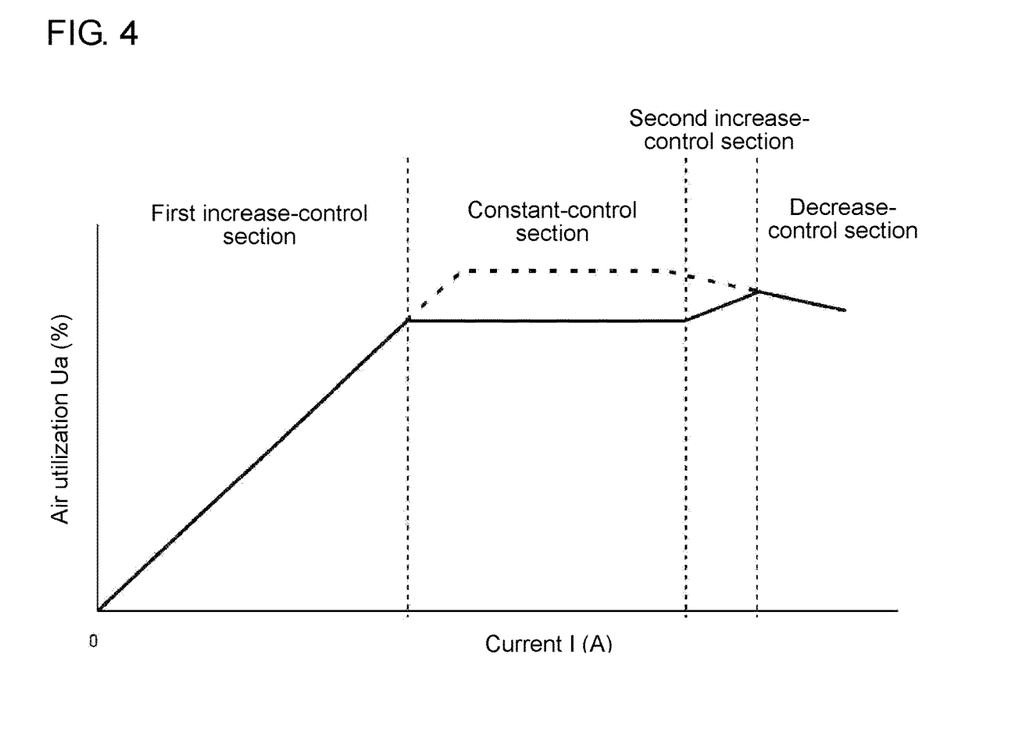
FIG. 4 is a graph showing the relationship between a generation current level (I) and an air utilization (Ua) in a cell stack included in a fuel cell system according to a second embodiment.

In the graph of FIG. 4 in the second embodiment, each of the relational expressions also includes a constant-control section to flatten the increase in the air utilization Ua that has gradually increased as the current level I increases in the first increase-control section. In the constant-control section, the air increases at the same ratio as the increase in the current level I as in the first constant-control section described in the first embodiment. In the constant-control section, the graph curve has no gradient and the coefficient in the primary expression representing the relationship between the current level I and the air utilization Ua is 0. The coefficient in the primary expression may not be precisely 0 but may be substantially 0.

In other words, in the independent operation mode in which the current increase rate set by the power regulator 20 is greater than or equal to a predetermined rate, the controller 30 in the fuel cell system 100 selects, at least in the constant-control section described above, the second relational expression (first constant-control section) defining the air utilization Ua lower than in the first relational expression (first increase-control section) for the current increase rate lower than the predetermined rate.

The relational expression may be selected entirely as described above, or may be selected, for example, partially for the different section. In the constant-control section, the air utilization Ua increases at a rate different from the rate of increase in the first increase-control section described above as the current increases.

This is followed by the second increase-control section, and then a decrease-control section in which the air utilization Ua decreases. When the first relational expression is used as a reference, the second increase-control section and the decrease-control section may also be referred to as continuous decrease-control sections. The decrease-control section is referred to as a rated section in which the output from the fuel cell is a maximum rated current.

Also, the minimum amount of air to be used can be calculated for a maximum current level I in the fuel cell (fuel cell module 1). The air utilization Ua corresponding to this minimum amount of air is then calculated.

In other words, the air utilization Ua in the second increase-control section and the decrease-control section is calculated based on the minimum amount of air for the maximum current level I. When the first relational expression is used as a reference, the second increase-control section and the decrease-control section are continuous decrease-control sections. This reduces the likelihood of the amount of air temporarily lacking for power generation in the cell stack and of the air utilization becoming high (high Ua) in response to a rapid increase in a load current (output current) requested from an external load.

In contrast, the second relational expression has the second increase-control section connecting the constant-control section and the decrease-control section. In the second increase-control section, the air flow rate increases at a lower rate than the increase in the current level I in the same manner as in the first embodiment. In this section, the graph curve has a positive gradient, or in other words, the coefficient in the primary equation representing the relationship between the current level I and the air utilization Ua is a positive value. The graph segment in this section may have a gradient set as appropriate and may have a larger or smaller gradient than in the first increase-control section.

In the second embodiment as well, the first increase-control section and the decrease-control section are separated by the constant-control section and the second increase-control section in which the air utilization Ua is lower than in the normal operation. This reduces the likelihood that the air utilization becomes high (high Ua) in these sections during the independent operation.

The fuel cell system can perform the independent operation in, for example, an outage, without the unit cells being damaged or having other failures. The fuel cell system can thus be durable.

The relational expressions may include, for example, a relational expression associated with the upper limit of the air utilization Ua and a relational expression associated with the upper and lower limits of the flow rate of the oxygen-containing gas. In this case, for example, such relational expressions may be defined for the first increase-control section, the constant-control section, the second increase-control section, and the decrease-control section and may be prioritized over one another for selection as appropriate.

The air flow rate control for controlling, or specifically increasing or decreasing the fuel utilization (Uf) representing the flow rate of fuel gas in response to the generation current level I (A) will now be described.

The controller 30 included in the fuel cell system 100 according to a third embodiment controls the fuel pump B2 in response to the generation current level I (A) controllable by the power regulator (hereafter, the power conditioner 20). The controller 30 controls the fuel pump B2 in accordance with the fuel utilization (Uf) preset in correspondence with the generation current level I (A). The fuel utilization (Uf) refers to the ratio of the amount of fuel used for power generation to the amount of fuel gas supplied to the fuel cell.

The controller 30 included in the fuel cell system 100 according to the third embodiment stores multiple relational expressions each representing the relationship between the generation power level of the fuel cell (fuel cell module 1) and the fuel utilization, and selects one of the relational expresses based on the current increase rate set by the power conditioner 20. The controller 30 selects a relational expression appropriate for the current increase rate to reduce damage to the unit cells.

The current increase rate refers to a displacement (difference) per unit time that occurs when the level of current generated by the fuel cell (generation current level or current value) changes, or specifically increases. The current increase rate is in amperes (A) per second.

Figure 5:
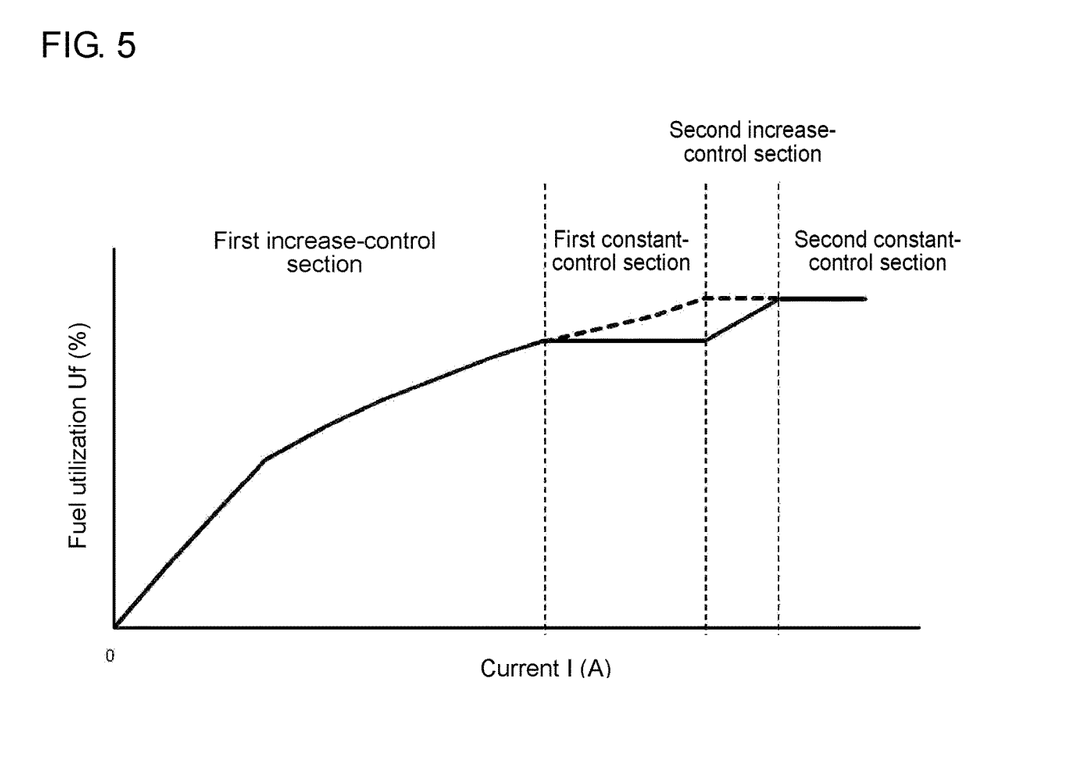
FIG. 5 is a graph showing the relationship between a generation current level (I) and a fuel utilization (Uf) in a cell stack included in a fuel cell system according to a third embodiment.

FIG. 5 is a graph showing the relationship between the current level (I) generated by power generation and the fuel utilization (Uf) in the cell stack included in the fuel cell system according to the third embodiment. FIG. 5 shows two curves of relational expressions, one indicated with a solid line and the other indicated partially with a broken line. The fuel utilization Uf and the generation current level I as the generation power level may be set as appropriate for, for example, the scale of the fuel cell system (rated generation power level). FIG. 5 thus merely shows example relational expressions (graph) representing the relationship between the fuel utilization Uf and the generation power level (I). Three or more relational expressions may be defined. The relational expressions will be described with reference to the graph in FIG. 5.

FIG. 5 shows examples of a third relational expression (partially indicated by a broken line) selected in a normal operation in one or more embodiments of the present disclosure and a fourth relational expression (indicated by a solid line) selected during an independent operation in, for example, an outage in one or more embodiments of the present disclosure. These relational expressions are identical except the part of the third relational expression indicated by the broken line. A segment indicated by a broken line in the curve of the third relational expression is an example segment of the graph curve showing the relationship between the fuel utilization Uf and the generation current level I during operation except during an independent operation in, for example, an outage. In other words, this is an example segment of the graph curve during the normal operation (when the current increase rate is slow or low in one or more embodiments of the present disclosure).

The identical parts of these relational expressions will be described first. In the graph of FIG. 5 showing the relationship between the generation current level I and the fuel utilization Uf of the fuel cell, each of the relational expressions includes a first increase-control section in which the fuel utilization Uf of the fuel cell gradually increases in response to an increase in the current level I.

In the first increase-control section, the fuel utilization Uf is set low at the start and then increases gradually in response to an increase in the current level I of the fuel cell.

In this manner, more extra fuel gas is used at the start to increase the heat of combustion, thus rapidly raising the temperature of the fuel cell and shortening the starting time. As the current level I increases, the fuel utilization Uf increases gradually. This raises the temperature of the fuel cell, while enabling an efficient operation.

In the graph of FIG. 5, each of the relational expressions includes a second constant-control section in which the fuel utilization Uf is constant. The second constant-control section is referred to as a rated section in which the output from the fuel cell is a maximum rated current. In the section in which the current level I is high, the fuel utilization Uf is set high for an efficient operation.

The third and fourth relational expressions differ from each other in the sections described below. More specifically, a first constant-control section and a second increase-control section in the graph of FIG. 5 above are different from the corresponding sections used in the normal operation. The first constant-control section and the second increase-control section are continuous with each other, and are examples of at least a partial current-control section in an aspect of the present disclosure. These relational expressions will be described using the fourth relational expression as a reference.

In FIG. 5, the first constant-control section is to flatten the increase in the fuel utilization Uf that has gradually increased as the current level I increases in the first increase-control section. In the first constant-control section, the raw fuel flow rate is increased at the same rate as the rate of increase in the current level I. The resultant segment of the graph has no gradient in this section, in which the relationship between the current level I and the fuel utilization Uf is represented by a primary expression with the coefficient 0. The coefficient in the primary expression may not be precisely 0 but may be substantially 0.

More specifically, in the independent operation mode in which the current increase rate set by the power conditioner 20 is greater than or equal to a predetermined rate, the controller 30 selects, at least in the first constant-control section described above, the fourth relational expression defining the fuel utilization Uf in the first constant-control section lower than in the first increase-control section included in the third relational expression to be selected for the current increase rate lower than the predetermined rate.

The relational expression may be selected entirely as described above, or may be selected, for example, partially for this different section. In the first constant-control section, the fuel utilization Uf increases at a rate different from the rate of increase in the first increase-control section described above as the current increases.

The first constant-control section is followed by the second increase-control section that connects the first constant-control section and the second constant-control section. In the second increase-control section, the relationship between the current level I and the fuel utilization Uf is represented by a primary expression with the coefficient of a positive (plus) value. The graph segment in this section may have a gradient set as appropriate and may have a larger or smaller gradient than in the first increase-control section.

In this manner, the first increase-control section and the second constant-control section are separated by the first constant-control section and the second increase-control section in which the fuel utilization Uf is lower than in the normal operation, or more raw fuel gas is supplied to the reformer. This reduces the likelihood of the fuel utilization becoming high (high Uf) in these sections during the independent operation.

The fuel cell system 100 according to the present embodiment entering the independent operation mode at the high current increase rate has the preset supply amount of raw fuel larger than in the normal operation, and thus is less likely to have the amount of fuel gas temporarily lacking for power generation in the cell stack and have the fuel utilization becoming high (high Uf) in response to a rapid increase in a load current (output current) requested from an external load.

The fuel cell system can perform the independent operation in, for example, an outage, without the unit cells being damaged or having other failures. The fuel cell system can thus be durable.

The increase in the fuel utilization Uf in response to the current level I in the second increase-control section in FIG. 5 may not be represented by a linear line (or function), but may be represented by a nonlinear function, such as a quadratic curve (quadratic function) or a third-order curve (third-order function). This is the same in the first increase-control section.

The relational expressions may include, for example, a relational expression associated with the upper limit of the fuel utilization Uf and a relational expression associated with the upper and lower limits of the flow rate of the fuel gas. In this case, for example, such relational expressions may be defined for the first increase-control section, the first constant-control section, the second increase-control section, and the second constant-control section and may be prioritized over one another for selection as appropriate.

Although the air flow rate control for controlling, or specifically increasing or decreasing, the air utilization (Ua) representing the flow rate of air in response to the generation current level I (A) and the fuel gas flow rate control for controlling, or increasing or decreasing, the fuel utilization (Uf) representing the flow rate of fuel gas in response to the generation current level I (A) are described separately above, the air flow rate control and the fuel gas flow rate control may be performed simultaneously.

The fuel cell system according to one or more embodiments of the present disclosure performs the independent operation with a lower likelihood of the unit cells being damaged or having other failures and thus can be durable.

The present disclosure may be embodied in various forms without departing from the spirit or the main features of the present disclosure. The embodiments described above are thus merely illustrative in all respects. The scope of the present disclosure is defined not by the description given above but by the claims. Any modifications and alterations contained in the claims fall within the scope of the present disclosure.

REFERENCE SIGNS LIST 1 fuel cell module
11 cell stack
12 reformer
20 power conditioner
30 controller
13 oxygen-containing gas supply
14 fuel supply
100 fuel cell system
F air channel
G raw fuel channel
B1 air blower
B2 fuel pump
FM1 air flowmeter
FM2 fuel flowmeter

The invention claimed is:

1. A fuel cell system, comprising:
a fuel cell configured to generate power using a fuel gas and an oxygen-containing gas;
an oxygen-containing gas supply configured to supply the oxygen-containing gas to the fuel cell;
a fuel supply configured to supply the fuel gas to the fuel cell;
a power regulator configured to regulate supply of a current generated in the fuel cell to a load; and
a controller configured to control at least one of the oxygen-containing gas supply or the fuel supply, and the power regulator,
wherein the controller includes a plurality of relational expressions predefined and representing a relationship between a generation power level of the fuel cell and at least one of an air utilization or a fuel utilization,
wherein the controller is configured to selects at least one of the plurality of relational expressions based on an increase rate of the current set by the power regulator, and
wherein the controller is configured to control operation of the fuel cell system based on the selection of at least one of the plurality of relational expressions.

2. The fuel cell system according to claim 1,
wherein the controller includes the plurality of relational expressions representing the relationship between the generation power level of the fuel cell and the air utilization, and
wherein the controller is configured to selects, in response to the increase rate of the current set by the power regulator being greater than or equal to a predetermined rate, a second relational expression in at least a partial current-control section, and
wherein the second relational expression defines the air utilization lower than being defined by a first relational expression to be selected in response to the increase rate of the current lower than the predetermined rate.

3. The fuel cell system according to claim 2,
wherein the second relational expression defines the air utilization to increase at a different increase rate in response to an increase in the current in at least the partial current-control section.

4. The fuel cell system according to claim 2,
wherein the controller is configured to selects the second relational expression for an independent operation of the fuel cell.

5. The fuel cell system according to claim 1,
wherein the controller includes the plurality of relational expressions representing the relationship between the generation power level of the fuel cell and the fuel utilization, and
wherein the controller is configured to selects, in response to the increase rate of the current set by the power regulator being greater than or equal to a predetermined rate, a fourth relational expression in at least a partial current-control section, and
wherein the fourth relational expression defines the fuel utilization lower than being defined by a third relational expression to be selected in response to the increase rate of the current lower than the predetermined rate.

6. The fuel cell system according to claim 5,
wherein the fourth relational expression defines the fuel utilization to increase at a different increase rate in response to an increase in the current in at least the partial current-control section.

7. The fuel cell system according to claim 5,
wherein the controller is configured to selects the fourth relational expression for an independent operation of the fuel cell.

* * * * *

UNITED STATES PATENT AND TRADEMARK OFFICE
CERTIFICATE OF CORRECTION

| | |
|---|---|
| PATENT NO. | : 12,113,253 B2 |
| APPLICATION NO. | : 17/614341 |
| DATED | : October 8, 2024 |
| INVENTOR(S) | : Eiji Taniguchi |

It is certified that error appears in the above-identified patent and that said Letters Patent is hereby corrected as shown below:

In the Claims

Claim 1, Column 11, Line 18: change "selects" to --select--

Claim 2, Column 11, Line 30: change "selects" to --select--

Claim 4, Column 12, Line 9: change "selects" to --select--

Claim 5, Column 12, Line 17: change "selects" to --select--

Claim 7, Column 12, Line 32: change "selects" to --select--

Signed and Sealed this
Third Day of December, 2024

Katherine Kelly Vidal
Director of the United States Patent and Trademark Office